(12) United States Patent
Day et al.

(10) Patent No.: US 8,078,771 B2
(45) Date of Patent: Dec. 13, 2011

(54) SENDING LARGE COMMAND DESCRIPTOR BLOCK (CDB) STRUCTURES IN SERIAL ATTACHED SCSI (SAS) CONTROLLER

(75) Inventors: Brian A. Day, Colorado Springs, CO (US); Ajay Dawra, Colorado Springs, CO (US); Parameshwar A. Kadekodi, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 221 days.

(21) Appl. No.: 12/315,704

(22) Filed: Dec. 5, 2008

(65) Prior Publication Data

US 2010/0115152 A1    May 6, 2010

Related U.S. Application Data

(60) Provisional application No. 61/197,974, filed on Oct. 31, 2008.

(51) Int. Cl.
*G06F 13/28* (2006.01)
*G06F 3/00* (2006.01)
*G06F 13/38* (2006.01)

(52) U.S. Cl. ............... 710/22; 710/26; 710/52; 710/62; 709/212; 711/4

(58) Field of Classification Search ......................... None
See application file for complete search history.

(56) References Cited

U.S. PATENT DOCUMENTS

| | | | | |
|---|---|---|---|---|
| 5,664,145 A * | 9/1997 | Apperley et al. | ............. | 711/117 |
| 6,088,750 A * | 7/2000 | Beaman et al. | ................ | 710/107 |
| 6,292,855 B1 * | 9/2001 | Johnson et al. | ................. | 710/33 |
| 6,314,477 B1 * | 11/2001 | Cowger et al. | ................. | 710/22 |
| 6,408,341 B1 * | 6/2002 | Feeney et al. | ................. | 709/250 |
| 6,594,712 B1 * | 7/2003 | Pettey et al. | .................... | 710/22 |
| 7,986,630 B1 * | 7/2011 | Nemazie et al. | .............. | 370/236 |
| 2003/0093637 A1 * | 5/2003 | Lee et al. | ....................... | 711/159 |
| 2006/0031600 A1 * | 2/2006 | Ellis et al. | ....................... | 710/22 |
| 2006/0064516 A1 * | 3/2006 | Ellis et al. | ....................... | 710/22 |
| 2007/0088864 A1 * | 4/2007 | Foster | ............................. | 710/22 |
| 2008/0016275 A1 * | 1/2008 | Sebastian et al. | ............. | 711/114 |
| 2008/0109617 A1 * | 5/2008 | Forrer et al. | ................... | 711/155 |

* cited by examiner

*Primary Examiner* — Henry Tsai
*Assistant Examiner* — Michael Sun
(74) *Attorney, Agent, or Firm* — Suiter Swantz pc llo

(57) ABSTRACT

A system for sending large Command Descriptor Block (CDB) structures in a serial attached SCSI (SAS) controller includes a CDB Transmit Block, a CDB Memory, a Context Memory, a Direct Memory Access (DMA) Queue, a Transmit DMA Engine, and a SAS Interface. The CDB Transmit Block receives one or more Message Frames. If the CDB is small (32 bytes or less), the CDB Transmit Block reads data from the Message Frame and transmits a SAS Command Frame over the SAS interface. If the CDB is large (33 bytes or more), the CDB Transmit Block places a large CDB entry into the DMA Queue. The Transmit DMA Engine receives the large CDB entry from the DMA queue, utilizes an address pointer from the Message Frame to the CDB Memory to fetch large CDB information into a DMA buffer, and transmits a SAS Command Frame over the SAS interface.

12 Claims, 3 Drawing Sheets

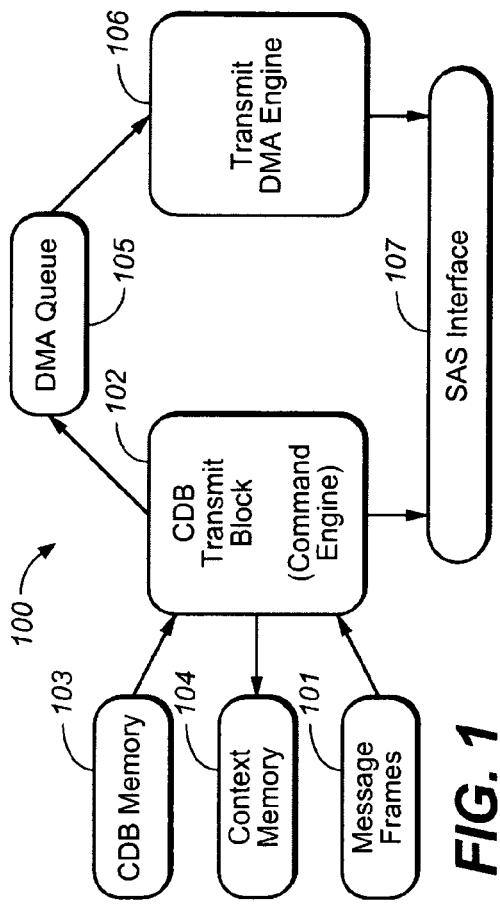

SENDING LARGE COMMAND DESCRIPTOR BLOCK (CDB) STRUCTURES IN SERIAL ATTACHED SCSI (SAS) CONTROLLER

CROSS-REFERENCE TO RELATED APPLICATIONS

The present application claims the benefit under 35 U.S.C. §119(e) of U.S. Provisional Application Ser. No. 61/197,974, filed Oct. 31, 2008. Said U.S. Provisional Application Ser. No. 61/197,974 is herein incorporated by reference in its entirety.

TECHNICAL FIELD

The present disclosure generally relates to the field of computer systems, and more particularly to sending large command descriptor block (CDB) structures in serial attached SCSI (small computer system interface) controllers.

BACKGROUND

Small computer system interface (SCSI) is a set of standards for interconnecting computing devices and/or peripheral devices (including, but not limited to hard disk drives, solid state drives, tape drives, scanners, printers, RAIDs (redundant array of independent disks), storage systems, and/or optical drives). The SCSI standards define commands, command sets, protocols, electrical interfaces, and optical interfaces. In SCSI, commands may be sent in a Command Descriptor Block (CDB). Most SCSI command sets, such as SCSI Block Commands (SBC) (a SCSI command set typically utilized for disk drives), limit their CDB to 32 bytes or less.

SUMMARY

A system for sending large Command Descriptor Block (CDB) structures in a serial attached SCSI (SAS) controller may include a CDB Transmit Block, a CDB Memory communicably coupled to the CDB Transmit Block, a Context Memory communicably coupled to the CDB Transmit Block, Message Frames, a Direct Memory Access (DMA) Queue communicably coupled to the CDB Transmit Block, a Transmit DMA Engine communicably coupled to the DMA Queue, and a SAS Interface communicably coupled to the CDB Transmit Block and the Transmit DMA Engine. The system may comprise a SAS controller.

The CDB Transmit Block may receive one or more Message Frames. When a CDB is approximately 32 bytes or less, the CDB may be contained within the Message Frame. When a CDB is approximately 32 bytes or more, the Message Frame may contain an address pointer of a large CDB structure contained in the CDB Memory instead of the actual CDB. If the CDB is small (approximately 32 bytes or less), the CDB Transmit Block may read data from the Message Frame and transmit a SAS Command Frame for the Message Frame over the SAS interface.

If the CDB is large (approximately 33 bytes or more), the CDB Transmit Block may not include sufficient hardware resources to generate appropriately large SAS Command Frames and may place a large CDB entry for the Message Frame into the DMA Queue. The Transmit DMA Engine may receive the large CDB entry from the DMA queue and may utilize an address pointer to the CDB Memory contained in the large CDB entry to fetch the large CDB information into the DMA buffer. After the entire large CDB information has been loaded into the DMA buffer, the Transmit DMA Engine may transmit a SAS Command Frame for the Message Frame over the SAS interface.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 1 is a block diagram illustrating a system 100 for sending large Command Descriptor Block (CDB) structures in a serial attached SCSI (SAS) controller, in accordance with an embodiment of the present disclosure;

FIG. 2 is a diagram of a message frame that may be utilized in the system 100 of FIG. 1, in accordance with an embodiment of the present disclosure;

FIG. 3 is a diagram of a Direct Memory Access (DMA) Transmission Queue entry that may be utilized in the system 100 of FIG. 1, in accordance with an embodiment of the present disclosure;

DETAILED DESCRIPTION

Figure 4:
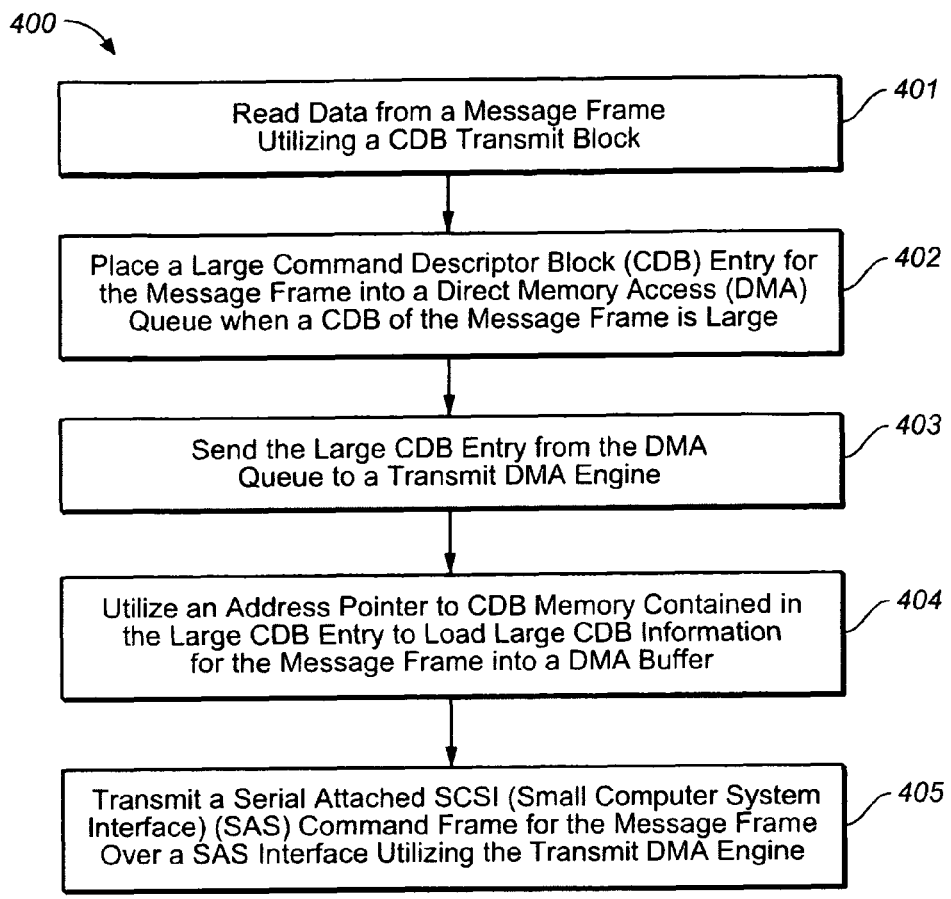
FIG. 4 is a flow diagram illustrating a method for sending large Command Descriptor Block (CDB) structures in a serial attached SCSI (SAS) controller, in accordance with an embodiment of the present disclosure.

Reference will now be made in detail to the subject matter disclosed, which is illustrated in the accompanying drawings.

Most SCSI (small computer system interface) command sets, such as SCSI Block Commands (SBC), limit their Command Descriptor Block (CDB) to 32 bytes or less. However, there are other command sets, such as the Object Storage Device (OSD), that utilize much larger CDB sizes. Typically, if the CDB is small (such as 32 bytes or less), a SCSI controller (such as a serial attached SCSI (SAS) controller) may utilize hardware to send the CDB. However, if the CDB is large (such as 33 bytes or more), the SCSI controller may have to use firmware to handle sending the CDB, if the firmware supports sending large CDBs at all. Handling these structures in firmware may not be as efficient or as high performance as utilizing hardware.

FIG. 1 illustrates a system 100 for sending large Command Descriptor Block (CDB) structures in a serial attached SCSI (SAS) controller, in accordance with an embodiment of the present disclosure. The system 100 may comprise a SCSI controller, such as a SAS controller. The system 100 may include a CDB Transmit Block 102 (or Command Engine), a CDB Memory 103 communicably coupled to the CDB Transmit Block 102, a Context Memory communicably coupled to the CDB Transmit Block 102, Message Frames 101, a Direct Memory Access (DMA) Queue 105 communicably coupled to the CDB Transmit Block 102, a Transmit DMA Engine 106 communicably coupled to the DMA Queue 105, and a SAS Interface 107 communicably coupled to the CDB Transmit Block 102 and the Transmit DMA Engine 106.

The CDB Transmit Block 102 may receive one or more Message Frames 101. The CDB Transmit Block 102 may be responsible for reading IO (input/output) command information from a Message Frame 101, translating that information into a SAS Command Frame, and/or initializing the Context Memory 104 for that IO for subsequent utilization of that IO by other design modules. A Message Frame 101 may comprise the main programming interface to the CDB Transmit Block 102. The CDB Transmit Block 102 may contain a required amount of storage elements to process CDB sizes up to approximately 32 bytes, or small CDBs. When a CDB is approximately 32 bytes or less, the CDB may be contained within the Message Frame 101. When a CDB is approximately 33 bytes or more, the Message Frame 101 may contain an address pointer of a large CDB structure contained in the CDB Memory 103 instead of the actual CDB. By being able to automatically support CDB sizes of up to approximately 32 bytes, the CDB Transmit Block 102 may be able to handle the majority of SCSI command protocols. In this way, the CDB Transmit Block 102 may handle the majority of cases while minimizing silicon area and complexity necessary to implement the CDB Transmit Block 102. If the CDB is small (approximately 32 bytes or less), the CDB Transmit Block 102 may read data from the Message Frame 101 and transmit a SAS Command Frame for the Message Frame 101 over the SAS interface 107.

The DMA Queue 105 may comprise a FIFO (first-in-first-out) structure and contain one or more entries of information to be processed by the Transmit DMA Engine 106. The DMA Queue 105 may be utilized to store work that is required in the normal processing of SAS IOs. The Transmit DMA Engine 106 may be utilized to transfer the actual user data for a given command, received as entries from the DMA Queue 105. These entries may be utilized to supply an address pointer to the data that needs to be transferred. These transfers typically are in terms of sectors or blocks of data, typically in the multi-kilobyte amounts. The Transmit DMA Engine 106 may include a DMA buffer (such as a 4 kilobyte buffer) to efficiently handle the data transfer for user data.

If the CDB is large (approximately 33 bytes or more), the CDB Transmit Block 102 may not include sufficient hardware resources to generate appropriately large SAS Command Frames. When the CDB is large (approximately 33 bytes or more), the CDB Transmit Block 102 may place a special type of DMA Queue 105 entry, a large CDB entry, for the Message Frame 101 into the DMA Queue 105. The Transmit DMA Engine 106 may receive the large CDB entry from the DMA queue 105. The Transmit DMA Engine 106 may utilize an address pointer to the CDB Memory 103 contained in the large CDB entry to fetch the large CDB information into the DMA buffer. After the entire large CDB information has been loaded into the DMA buffer, the Transmit DMA Engine 106 may transmit a SAS Command Frame for the Message Frame 101 over the SAS interface 107. The Transmit DMA Engine 106 may include a small amount of hardware logic beyond that required for normal processing of SAS IOs to process the special large CDB entries from the DMA Queue 105. Because of the nature of the operation of SAS, a given IO may only be in a state to either transfer the command or transfer data. As these are mutually exclusive, the DMA Queue 105 may not need to be sized any larger to accommodate large CDB entries than what may be required for normal IOs.

FIG. 2 illustrates an example of a Message Frame 101 that may be utilized in the system 100, in accordance with an embodiment of the present disclosure. A Message Frame 101 may contain an Application Context field, which may contain information useful for normal IO operation and unrelated to the CDB. This may contain information such as scatter-gather lists, device addressing information, etc. A Message Frame 101 contains some form of CDB Control Flags. Minimally, the CDB Control Flags contain a Large CDB Flag indicating whether this Message Frame is for a small CDB or for a large CDB. The Message Frame 101 also contains a CDB Field. If the Large CDB Flag indicates the Message Frame is for a small CDB, the CDB Field contains the actual CDB information. If the CDB Flag indicated the Message Frame 101 is for a large CDB, the CDB Field contains an address pointer to a CDB contained in CDB Memory 103. Optionally, the CDB Control Flags may contain a value indicating the length of the CDB.

FIG. 3 illustrates an example of a Direct Memory Access (DMA) Queue entry that may be utilized in the system 100, in accordance with an embodiment of the present disclosure. FIG. 3 may illustrate the entry format of a Direct Memory Access (DMA) Queue entry. Regarding FIG. 3:

| | |
|---|---|
| Entry Type | This field indicates whether the DMA Queue Entry is for a normal IO operation, or for a large CDB operation. |
| Device Address | This field indicates some form of device addressing information to specify the unique target device that the SAS frame is transmitted to. |
| Frame Type | This field indicates the value of the FRAME TYPE field of the transmitted SAS frame (as specified by the SAS specification). |
| TAG | This field indicates the value of the TAG field of the transmitted SAS frame. |
| CDB Address Pointer | This field contains the address pointer as indicated from the original Message Frame 101 specifying the location of the CDB in CDB Memory 103. |

The present disclosure is described below with reference to flowchart illustrations of methods. It will be understood that each block of the flowchart illustrations and/or combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart. These computer program instructions may also be stored in a computer-readable tangible medium (thus comprising a computer program product) that can direct a computer or other programmable data processing apparatus to function in a particular manner, such that the instructions stored in the computer-readable tangible medium produce an article of manufacture including instruction means which implement the function/act specified in the flowchart.

FIG. 4 illustrates a method for sending large CDB structures in a SAS controller, in accordance with an embodiment of the present disclosure. In step 401, read data from a message frame utilizing a CDB Transmit Block. The message frame may comprise an OSD SCSI command set message frame. In step 402, place a large command descriptor block (CDB) entry for the message frame into a direct memory access (DMA) queue when a CDB of the message frame is large. The CDB of the message frame may be large when the CDB of the message frame is at least approximately thirty-three bytes. In step 403, send the large CDB entry from the DMA queue to a transmit DMA engine. In step 404, utilize an address pointer to CDB memory contained in the large CDB entry to load large CDB information for the message frame into a DMA buffer. In step 405, transmit a serial attached SCSI (small computer system interface) (SAS) command frame for the message frame over a SAS interface utilizing the transmit DMA engine.

Figure 5:
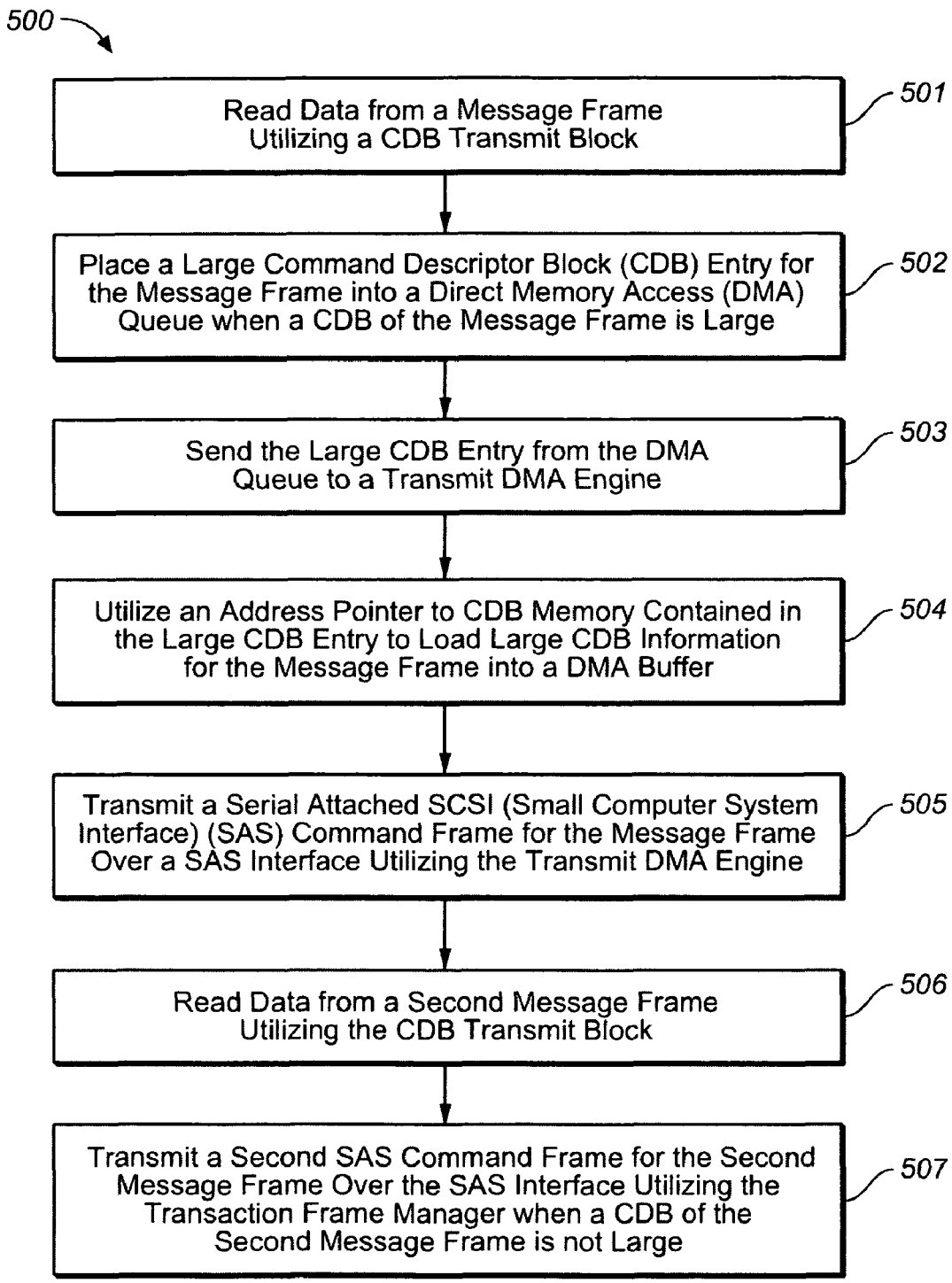
FIG. 5 is a flow diagram illustrating a method for sending large Command Descriptor Block (CDB) structures in a serial attached SCSI (SAS) controller, in accordance with an alternative embodiment of the present disclosure.

FIG. 5 illustrates a method for sending large CDB structures in a SAS controller, in accordance with an alternative embodiment of the present disclosure. In step 501, read data from a message frame utilizing a CDB Transmit Block. The message frame may comprise an OSD SCSI command set message frame. In step 502, place a large command descriptor block (CDB) entry for the message frame into a direct memory access (DMA) queue when a CDB of the message frame is large. The CDB of the message frame may be large when the CDB of the message frame is at least approximately thirty-three bytes. In step 503, send the large CDB entry from the DMA queue to a transmit DMA engine. In step 504, utilize an address pointer to CDB memory contained in the large CDB entry to load large CDB information for the message frame into a DMA buffer. In step 505, transmit a serial attached SCSI (small computer system interface) (SAS) command frame for the message frame over a SAS interface utilizing the transmit DMA engine. In step 506, read data from a second message frame utilizing the CDB Transmit Block. In step 507, transmit a second SAS command frame for the second message frame over the SAS interface utilizing the CDB Transmit Block when a CDB of the second message frame is not large. The CDB of the message frame may not be large when the CDB of the message frame is less than or equal to approximately thirty-two bytes.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method, comprising:
   reading data from a message frame utilizing a command descriptor block (CDB) transmit block;
   determining whether a size of a CDB of the message frame is larger than thirty-three bytes;
   upon determining the size of the CDB of the message frame is larger than thirty-three bytes, placing a large CDB entry for the message frame having a CDB larger than thirty-three bytes into a direct memory access (DMA) queue;
   sending the large CDB entry from the DMA queue to a transmit DMA engine;
   utilizing an address pointer to CDB memory contained in the large CDB entry to load large CDB information for the message frame into a DMA buffer;
   transmitting a serial attached SCSI (small computer system interface) (SAS) command frame for the message frame having a CDB larger than thirty-three bytes over a SAS interface utilizing the transmit DMA engine; and
   upon determining the size of the CDB of the message frame is smaller than thirty-three bytes, transmitting a SAS command frame for the message frame having a CDB smaller than thirty-three bytes over the SAS interface utilizing the CDB transmit block.

2. The method of claim 1, wherein the message frame comprises an Object Storage Device (OSD) SCSI command set message frame.

3. The method of claim 1, further comprising:
   reading data from a second message frame utilizing a transaction frame manager; and
   transmitting a second SAS command frame for the second message frame over the SAS interface utilizing the CDB Transmit Block when a CDB of the second message frame is smaller than thirty-three bytes.

4. A computer program product for sending large command descriptor block (CDB) structures in a serial attached SCSI (small computer system interface) (SAS) controller, the computer program product comprising:
   a non-transitory computer usable medium having computer usable code tangibly embodied therewith, the computer usable program code comprising:
      computer usable program code configured to read data from a message frame utilizing a CDB Transmit Block;
      computer usable program code configured to determining whether a size of a CDB of the message frame is larger than thirty-three bytes;
      computer usable program code configured to place a large CDB entry for a message frame having a CDB larger than thirty-three bytes into a direct memory access (DMA) queue;
   computer usable program code configured to send the large CDB entry from the DMA queue to a transmit DMA engine;
   computer usable program code configured to utilize an address pointer to CDB memory contained in the large CDB entry to load large CDB information for the message frame into a DMA buffer;
   computer usable program code configured to transmit a SAS command frame for the message frame having a CDB larger than thirty-three bytes over a SAS interface utilizing the transmit DMA engine; and
   computer usable program code configured to transmit a SAS command frame for the message frame having a CDB smaller than thirty-three bytes over the SAS interface utilizing the CDB transmit block.

5. The computer program product of claim 4, wherein the message frame comprises an Object Storage Device (OSD) SCSI command set message frame.

6. The computer program product of claim 4, further comprising:
   computer usable program code configured to read data from a second message frame utilizing the CDB Transmit Block;
   computer usable program code configured to transmit a second SAS command frame for the second message frame over the SAS interface utilizing the CDB Transmit Block when a CDB of the second message frame is smaller than thirty-three bytes.

7. A system, comprising:
a direct memory access (DMA) queue;
a command descriptor block (CDB) transmit block configured to:
  receive a message frame;
  determine whether a size of a CDB of the message frame is larger than thirty-three bytes;
  place a large CDB entry for a message frame having a CDB larger than thirty-three bytes into the DMA queue; and
  transmit a SAS command frame for a message frame having a CDB smaller than thirty-three bytes over the SAS interface utilizing the CDB transmit block; and
a transmit DMA engine configured to receive the large CDB entry from the DMA queue,
wherein the transmit DMA engine is configured to utilize an address pointer to a CDB memory contained in the large CDB entry to load large CDB information for the message frame having a CDB larger than thirty-three bytes into a DMA buffer and transmit a serial attached SCSI (small computer system interface) (SAS) frame for the message frame having a CDB larger than thirty-three bytes over a SAS interface.

8. The system of claim 7, wherein the message frame comprises an Object Storage Device (OSD) SCSI command set message frame.

9. The system of claim 7, wherein the CDB Transmit Block is configured to read data from a second message frame and transmit a second SAS command frame for the second message frame over the SAS interface when a CDB of the second message frame is not large smaller than thirty-three bytes.

10. A serial attached SCSI (small computer system interface) (SAS) controller, comprising:
a direct memory access (DMA) queue;
a command descriptor block (CDB) transmit block, communicatively coupled to the DMA queue, wherein the CDB Transmit Block is configured to:
  receive a message frame;
  determine whether a size of a CDB of the message frame is larger than thirty-three bytes;
  place a large CDB entry for a message frame having a CDB larger than thirty-three bytes into the DMA queue; and
  transmit a SAS command frame for a message frame having a CDB smaller than thirty-three bytes over the SAS interface utilizing the CDB transmit block; and
a transmit DMA engine communicatively coupled to the DMA queue, wherein the transmit DMA engine is configured to receive the large CDB from the DMA queue;
a SAS interface, communicatively coupled to the CDB Transmit Block and the transmit DMA engine,
wherein the transmit DMA engine is configured to utilize an address pointer to a CDB memory contained in the large CDB entry to load large CDB information for the message frame having a CDB larger than thirty-three bytes into a DMA buffer and transmit a SAS frame for the message frame having a CDB larger than thirty-three bytes over the SAS interface.

11. The SAS controller of claim 10, wherein the message frame comprises an Object Storage Device (OSD) SCSI command set message frame.

12. The SAS controller of claim 10, wherein the CDB Transmit Block is configured to read data from a second message frame and transmit a second SAS command frame for the second message frame over the SAS interface when a CDB of the second message frame is smaller than thirty-three bytes.

* * * * *